United States Patent [19]

Loew et al.

[11] Patent Number: 5,039,416

[45] Date of Patent: Aug. 13, 1991

[54] PROCESS FOR THE PURIFICATION OF INDUSTRIAL WASTE-WATERS

[75] Inventors: Richard Loew; Wolfgang Samhaber, both of Riehen; Anton Wyss, Witterswil, all of Switzerland

[73] Assignee: Sandoz Ltd., Basel, Switzerland

[21] Appl. No.: 346,767

[22] Filed: May 3, 1989

[30] Foreign Application Priority Data

May 5, 1988 [DE] Fed. Rep. of Germany ....... 3815271

[51] Int. Cl.$^5$ ............................................... C02F 3/00
[52] U.S. Cl. ...................... 210/631; 210/638; 210/639; 210/668; 210/759
[58] Field of Search ........ 210/631, 638, 639, 650–652, 210/663, 668, 669, 694, 759, 763, 670

[56] References Cited

U.S. PATENT DOCUMENTS

| | | | |
|---|---|---|---|
| 3,472,765 | 10/1969 | Budd et al. | 210/651 |
| 4,005,011 | 1/1977 | Sweeny | 210/18 |
| 4,066,538 | 1/1978 | Cines et al. | 210/631 X |
| 4,073,722 | 2/1978 | Grutsch et al. | 210/631 X |
| 4,178,239 | 12/1979 | Lowther | 210/631 |
| 4,294,703 | 10/1981 | Wilms et al. | 210/759 |
| 4,765,900 | 8/1988 | Schwoyer et al. | 210/631 X |
| 4,812,237 | 3/1989 | Cawley et al. | 210/650 |
| 4,956,093 | 9/1990 | Pirbazari et al. | 210/631 |

FOREIGN PATENT DOCUMENTS

| | | |
|---|---|---|
| 104648 | 4/1984 | European Pat. Off. . |
| 202387 | 11/1986 | European Pat. Off. . |
| 251691 | 1/1988 | European Pat. Off. . |
| 1512555 | 1/1968 | France . |
| 62-244494 | 10/1987 | Japan . |
| 62-289299 | 12/1987 | Japan . |
| 1439401 | 6/1976 | United Kingdom . |

*Primary Examiner*—Tom Wyse
*Attorney, Agent, or Firm*—Gerald D. Sharkin; Richard E. Vila; Diane E. Furman

[57] ABSTRACT

The invention relates to a process for treating industrial waste water which comprises either: (a) pre-treating the waste water with at least two different pre-treatments selected from adsorption, membrane filtration and oxidation and then, biologically purifying the waste water or, (b) neutralizing and biologically purifying the waste water and then after-treating the waste water either by membrane filtration in combination with adsorption or oxidation or, by oxidation optionally in combination with adsorption or filtration on a nanofiltration membrane or, by filtration on a nanofiltration membrane.

15 Claims, No Drawings

PROCESS FOR THE PURIFICATION OF INDUSTRIAL WASTE-WATERS

This invention relates to a process for treating waste water, e.g. industrial waste water.

Before discharging waste water into the surrounding environment, it is nowadays highly necessary to purify it so that pollution may be reduced. Domestic waste water which is usually composed of waterborne wastes derived from household uses and light industries can be sufficiently cleaned by existing waste water purification plants.

A process for treating sewage in such plants usually comprises a step of oxidizing the organic material present in the sewage as well as reducing the amount of inorganics and inactivating pathogenic constituents. This step is usually of a biological nature and most commonly includes treating effluents with activated sludges in an aeration tank. The microbial components of activated sludges consist of a variety of bacteria, fungi, protozoa and algae and are derived from the sewage itself. Advantageously, the effluents are neutralized before being biologically purified. As a particular example, a purification process carried out in waste water purification plants conventionally comprises in sequence neutralizing, clarifying, biologically purifying and again clarifying the effluents. Thus, by waste water purification plant is meant hereinafter a plant in which the waste water is treated in sequence by neutralization, clarification, biological purification and again clarification.

In contrast to the general uniformity of substances found in domestic waste water, industrial waste water shows increasing variation as the complexity of industrial processes rises. By-products from e.g. dyeing, food processing, textile or paper industries are not easily degradable by biological processes and must be removed from waste water before or after carrying out a conventional treatment, so that the waste water can be discharged into surface waters or be reused without risk of pollution.

The quality of water is conveniently expressed by the content of total organic carbon (TOC) and of dissolved organic carbon (DOC) as well as by the content of refractory organic carbon (ROC) which represents the organic part which is hardly or not at all bio-degradable.

It has been found that, in addition to a conventional treatment comprising at least one biological purifying step, very effective purification of industrial waste water is achieved if the contaminated waste water is submitted either (a) to at least two of the following treatments in any order: adsorption, membrane filtration and oxidation before passing through a conventional waste water purification plant or, (b) to membrane filtration in combination with adsorption or oxidation, or to oxidation optionally in combination with adsorption or filtration on a nanofiltration membrane, or to filtration on a nanofiltration membrane, after passing through a conventional waste water purification plant.

Accordingly, the invention provides a process for treating waste water comprising pre-treating the waste water with at least two different pre-treatments selected from adsorption, membrane filtration and oxidation and then, biologically purifying the waste water.

Preferably, the process comprises pre-treating the waste water with at least two different pre-treatments selected from adsorption, membrane filtration and oxidation and treating the waste water in a biological plant. It is also particularly preferred that one of the two pre-treatments be adsorption.

According to another aspect of the invention, the invention also provides a process for treating waste water comprising neutralizing and biologically purifying the waste water and then, after-treating the waste water either by membrane filtration in combination with adsorption or oxidation, or by oxidation optionally in combination with adsorption or filtration on a nanofiltration membrane, or by filtration on a nanofiltration membrane.

In a preferred manner, a process for treating waste water comprises treating the waste water in a waste water purification plant and then, after-treating the waste water either by membrane filtration in combination with adsorption or oxidation, or by oxidation optionally in combination with adsorption or filtration on a nanofiltration membrane, or by filtration on a nanofiltration membrane.

The membranes used to separate the dissolved substances may be hyper-, nano- or ultrafiltration membranes. However, they are preferably nanofiltration membranes (NF) which have a selectivity lying between that of the hyperfiltration membranes (also called reverse osmosis (RO) membranes) and that of the ultrafiltration (UF) membranes. These nanofiltration membranes (also called transitional membranes) which should lie within the transitional range of RO and UF allow, to a greater or lesser extent, the passage of low molecular weight, water-soluble inorganic substances, especially salts, while low molecular weight organic substances with a molecular weight of more than 500 Daltons are more or less totally retained. The retention coefficient of these membranes also depends on hydrophilic/hydrophobic properties of the substances to be filtered. Usually hydrophobic substances are preferably retained. Such membranes are generally characterized by a retention coefficient e.g. for NaCl of almost 0% and for $Na_2SO_4$ of about 20%.

It is also preferred that, when the neutralizing and biological treatments are followed by an after-treatment, this after-treatment be filtration on nanofiltration membrane.

It has now been found that not only do these membranes have generally a good retention for organic waste water contaminants, but they are also very effective in selectively retaining materials which are removed by adsorption e.g. on active charcoal, with difficulty or not at all.

Membrane filtration is generally effected under a pressure from 5 to 80 Bar, preferably 10 to 40 Bar, and at a temperature from 5° to 95° C., preferably from 20° to 60° C. These membranes may be used in either continuous or discontinuous process.

If the type and the concentration of the harmful materials in the waste water to be purified is such that it is desirable to remove them sequentially, membrane filtration can also be carried out in several steps, whereby the selectivity of the membranes employed is adapted to the make-up of the waste water, as regards quality and concentration of harmful material. Within the flow of the waste water, membranes of different permeability and/or operated at different pressures are connected in series so that separation of the harmful materials takes place in fractions.

In accordance with the invention, it has also been found that organic components which are scarcely retained by membrane filtration can be adsorbed very easily. Indeed the adsorptive treatment is particularly suitable for removing the ROC substances as well as organic impurities.

Adsorption is advantageously carried out by using adsorption resins, metal oxides, ion exchanges, filtering earths and various kinds of carbon. Suitable adsorption resins are polystyrene or acrylic ester resins, preferably Amberlite polymeric resins commercialized by Rohm and Haas (XAD type). A preferred metal oxide is $Al_2O_3$. Most preferably, adsorption is effected on a column of granulated active charcoal, constructed as a sliding bed.

Oxidation is suitable for substantially degrading organic materials and more particularly ROC substances which are then converted into biologically degradable compounds. Furthermore, after an oxidative treatment, the remaining ROC substances are subsequently adsorbed with higher selectivity. Part of the organic materials can also be oxidized into carbon dioxide and water.

Suitable oxidizing agents for use in the present invention are e.g. ozone, chlorine, sodium hypochlorite or hydrogen peroxide, the latter being preferred. Oxidation with hydrogen peroxide is advantageously carried out in the presence of catalytic amounts of a cation e.g. copper, aluminium, zinc or iron, the last being preferred. $Fe(OH)_3$, $Fe_2O_3$, $FeCl_3$, $Fe_2(SO_4)_3$, $FeO$, $Fe(OH)_2$, $FeCl_2$, and $FeSO_4.7H_2O$ are suitable catalysts, those in which the iron cation is in $Fe^{++}$ form being preferred. $FeSO_4.7H_2O$ is particularly preferred. The molecular ratio between $H_2O_2$ (35% V/V) and iron compound is advantageously from 30:1 to 3:1, preferably from 20:1 to 10:1.

The pH and the temperature of the waste water to be oxidized are relatively unimportant and may be in general from pH 1 to 12, preferably from pH 2 to 12, most preferably from pH 3 to 5 and from 20° to 60° C., preferably from 20° to 40° C.

EXAMPLE 1

A process waste water from dyestuff production had a pH about 2 and was almost opaque in a layer thickness of 2 cm. It contained 1.8 g/l TOC made up by 1.75 g/l DOC and 0.78 g/l ROC.

After removal of the non-soluble particles by conventional filtration, the waste-water was added to a column of active charcoal. Filtration was operated over a 30 min period of time through 4 l of charcoal per m³ waste water.

Then the column flow through was applied to a membrane characterized by a retention capacity MWCO for NaCl about 0% and for $Na_2SO_4$ about 20%, at 20–30 Bar pressure. The flow of permeate through the membrane was about 10 to 40 l/m² surface/hour.

The permeate so obtained was then suitable for further biological purification since the colour and the TOC-content were reduced by 92–98 and 34–40% respectively. The bio-degradability (OECD) was raised from 66% to 99%.

EXAMPLE 2

A deeply dyed process waste water from dyestuff production was collected in a tank during the course of one day. It had a pH of 2.5 and contained, after removal of the undissolved substances, 1.47 g/l TOC, 36% of which was not bio-degradable.

This waste water was applied to a membrane which had the characteristics set out in Example 1, under conditions described in Example 1. The permeate subsequently obtained was then mixed, in continuous operation, whilst stirring, with 0.35 kg $FeSO_4.(7H_2O)$ and subsequently 3.5 kg $H_2O_2$ (35% V/V) per m³ of wastewater.

At this stage, the waste water thus obtained was suitable for biological purification as the colour and the TOC content were reduced by 76 and 52%, respectively. The bio-degradability (OECD) was raised from 64 to 86%.

EXAMPLE 3

A process waste water (weekly mixed sample) containing 900 m/lg TOC was, in sequence, neutralized, clarified, biologically purified, conventionally filtered and again clarified in a waste water purification plant. The TOC content of the waste water so obtained was reduced by 76%.

Then the waste water was applied to a filtration membrane which had the characteristics set out in Example 1, under conditions as described in Example 1. This filtration step was connected in series with the conventional process. The permeate contained 1.25 mg/l TOC, which corresponds to a reduction of the TOC content by more than 86% after all the purification steps have been carried out.

EXAMPLE 4

A slightly dyed process waste water from the production of intermediate dyestuff products was collected in a tank, the pH of this waste water being about 4. It contained 24.5 g/l TOC, 47% of which was not bio-degradable.

The waste water was first heated to 30°–40° C. Whilst stirring and cooling with ice to maintain the internal temperature at 30°–40° C., 15 kg $FeSO_4.(7H_2O)$ and subsequently 89 kg $H_2O_2$ (35% V/V) were added per m³ of waste water. $H_2O_2$ was mixed portionwise.

After removal of the non-soluble particles by conventional filtration, the waste water was applied on a column of granulated active charcoal having a loose weight of 402 g/l and a surface of 1200 m²/g. 40 l of charcoal were needed for treating one m³ waste water. The filtration was operated over a 120 min period of time.

The column flow through was then suitable for further biological purification as the colour and the TOC content were reduced by 77% and 37% respectively in comparison to the untreated waste water. The bio-degradability was also improved from 53 to 92%.

EXAMPLE 5

Various deeply dyed waste waters from dyestuff production were collected together in a tank during the course of one day. The pH of the final waste water mixture was about 2. This waste water contained 1.65 g/l TOC, 43% of which was not bio-degradable.

The waste-water was adjusted to pH 4 by adding NaOH and heated to 30°–40° C. Whilst stirring, 1.04 kg $FeSO_4.(7H_2O)$ and subsequently 6 kg $H_2O_2$ (35% V/V) were added per m³ of waste water. $H_2O_2$ was mixed portionwise.

After removal of the non-soluble particles, the waste water was applied to a column of granulated active charcoal having a loose weight of 402 g/l and an active surface of 1200 m²/g. 6 l of charcoal were needed for treating one m³ of waste water. The filtration was operated over a 30 min period of time.

The column flow through was then suitable for further biological purification as the colour and the TOC content were reduced by 89 and 42% respectively. The bio-degradability was improved from 57 to 89% as measured in the Husmann test.

EXAMPLE 6

Various deeply dyed waste-waters from dyestuff production were collected together, the final mixture having a pH of 2.9. The TOC content was 1.38 g/l made up by 1.26 g DOC. 33% of the TOC content was not bio-degradable.

After removal of the non-soluble particles by conventional filtration, the waste-water was applied to a column of granulated active charcoal, having a loose weight of 402 g/l and an active surface of 1200 m²/g. 10 l charcoal were needed for treating one m³ of waste water. The filtration was operated over a 30 min period of time.

Then, the column flow through was adjusted to pH 4 with NaOH and heated to 30° C. Whilst stirring, 0.26 kg $FeSO_4.(7H_2O)$ and subsequently 1.5 kg $H_2O_2$ (35% V/V) were added per m³ of waste water. $H_2O_2$ was mixed portionwise.

The waste water so obtained was then suitable for further biological purification as the colour and the TOC content were reduced by 74 and 49% respectively. The bio-degradability was raised from 67 to 85% as measured in the Husmann test.

We claim:

1. A process for purifying waste-water which comprises carrying out, prior to biological purification, at least two different pre-treatment steps, one of said steps comprising membrane filtration on a nanofiltration membrane, and the other step being selected from: (a) adsorption and (b) oxidation by $H_2O_2$ in the presence of catalytic amounts of a cation selected from copper, aluminum, zinc and iron, said steps being carried out in any order.

2. A process according to claim 1 wherein the pre-treatment steps comprise adsorption followed by membrane filtration.

3. A process according to claim 1 wherein the pre-treatment steps comprise membrane filtration followed by oxidation.

4. A process according to claim 1 or 2 wherein adsorption is carried out by treating the waste water with a material selected from polystyrene and acrylic ester resins, metal oxides, ion exchanges, filtering earths and carbon.

5. A process according to claim 4 wherein the adsorption material comprises aluminum oxide.

6. A process according to claim 1 or 3 wherein in the oxidation step the cation is iron and is provided by a compound selected from $Fe(OH)_3$, $Fe_2O_3$, $FeCl_3$, $Fe_2(SO_4)_3$, $FeO$, $Fe(OH)_2$, $FeCl_2$ and $FeSO_4.7H_2O$.

7. A process according to claim 6 wherein the oxidation step is carried out at pH 3 to 5 and at a temperature of from 20°-40° C.

8. A process according to claims 1, 2 or 3, in which the nanofiltration membrane is characterized by a retention capacity of NaCl of almost 0% and for $Na_2SO_4$ of about 20%.

9. A process according to claim 8 wherein membrane filtration is effected under a pressure of 10 to 40 Bar, at a temperature of 20°-60° C.

10. A process according to claim 1, in which adsorption is carried out on active charcoal.

11. A process according to claim 1, in which the cation is $Fe^{++}$ as provided by $FeSO_4.7H_2O$.

12. A process according to claim 11, in which the molecular ratio between $H_2O_2$ (35% V/V) and $FeSO_4.7H_2O$ is from 30:1 to 3:1.

13. A process for purifying waste-water which comprises carrying out prior to biological purification the steps comprising: (1) membrane filtration on a nanofiltration membrane characterized by a retention capacity of NaCl of almost 0% and for $Na_2SO_4$ of about 20% and (2) oxidation by $H_2O_2$ in the presence of catalytic amounts of the cation $Fe^{++}$ in the form of $FeSO_4.7H_2O$, wherein the molecular ratio between $H_2O_2$ (35% V/V) and $FeSO_4.7H_2O$ is from 30:1 to 3:1, at pH of 2 to 12 and a temperature of from 20°-60° C.

14. A process for purifying waste-water which comprises carrying out prior to biological purification the steps comprising: (1) adsorption on active charcoal, and (2) membrane filtration on a nanofiltration membrane characterized by a retention capacity of NaCl of almost 0% and for $Na_2SO_4$ of about 20%.

15. A process according to claims 1, 13 or 14 wherein biological purification is carried out in a waste water purification plant.

* * * * *